United States Patent
Wagnall et al.

(10) Patent No.: US 10,508,209 B2
(45) Date of Patent: Dec. 17, 2019

(54) CURABLE COMPOSITIONS FOR PRINTING APPLICATIONS, METHOD FOR COATING A SUBSTRATE, COATING AND CURED COMPOSITIONS

(71) Applicant: HEIDELBERGER DRUCKMASCHINEN AG, Heidelberg (DE)

(72) Inventors: Stephen Wagnall, Hemel Hempstead (GB); Lee Isaac, Aylesbury (GB)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/249,963

(22) Filed: Jan. 17, 2019

(65) Prior Publication Data
US 2019/0276691 A1 Sep. 12, 2019

(30) Foreign Application Priority Data
Mar. 8, 2018 (EP) .................................... 18160679

(51) Int. Cl.
*C09D 11/107* (2014.01)
*B41M 7/00* (2006.01)
*C09D 11/101* (2014.01)
*B41M 3/06* (2006.01)

(52) U.S. Cl.
CPC ............. *C09D 11/107* (2013.01); *B41M 3/06* (2013.01); *B41M 7/0045* (2013.01); *C09D 11/101* (2013.01)

(58) Field of Classification Search
None
See application file for complete search history.

(56) References Cited

FOREIGN PATENT DOCUMENTS

| CN | 103834296 A | 6/2014 |
|----|-------------|--------|
| JP | 2012230317 A | 11/2012 |
| WO | 2017025380 A1 | 2/2017 |
| WO | 2017148742 A1 | 9/2017 |

*Primary Examiner* — Joshua D Zimmerman
(74) *Attorney, Agent, or Firm* — Laurence A. Greenberg; Werner H. Stemer; Ralph E. Locher

(57) ABSTRACT

Curable compositions are based on ethoxylated triacrylates and alkylglycidyletheracrylates which can be employed to obtain printing products with a soft touch coating. The curable compositions are processed in conventional printing machines where sheets of glossy and matt paper have the curable compositions applied thereto with an anilox roller and then the paper is dried by UV lamps.

20 Claims, No Drawings

CURABLE COMPOSITIONS FOR PRINTING APPLICATIONS, METHOD FOR COATING A SUBSTRATE, COATING AND CURED COMPOSITIONS

CROSS-REFERENCE TO RELATED APPLICATION

This application claims the priority, under 35 U.S.C. § 119, of European Patent Application EP 1816 0679.9-1102, filed Mar. 8, 2018; the prior application is herewith incorporated by reference in its entirety.

BACKGROUND OF THE INVENTION

Field of the Invention

The invention relates to curable compositions which can beneficially be employed in printing machines to obtain printing products with a soft touch coating.

Printing products with soft touch coatings are desirable due to their soft and warm feeling that provide a more pleasing, luxurious feel to paper, paperboard, plastic, metal or other hard substrates.

Apart from their unique tactile feeling, soft touch coatings on printing products should also have other properties to function constantly when frequent interactions between users and the coating surface happen. Such properties include robust adhesion to the substrate, improved chemical resistance such as to human sweat, excellent scratch resistance and non-yellowing.

Curable compositions which can be employed to obtain soft touch coatings have been described before, in principle.

International patent disclosure WO 2017/025380 A1 describes one-part curable compositions which have a soft feel when applied as a coating and subsequently cured. Those compositions are based on isocyanurate tri(meth)acrylates and at least one further component.

The curable compositions of the prior art are connected with drawbacks. These drawbacks are particularly important when it comes to the application of the curable compositions in printing machines.

Some curable compositions of the prior art are based on two-part systems, e.g. employing isocyanate chemistry. Such compositions suffer from limited shelf-life, long curing times and poor protective properties such as stain, chemical, abrasion and mar resistance. Due to the emission of unhealthy isocyanates, the use of these curable compositions in printing machines is generally limited. Most curable compositions of the prior art contain a considerable amount of water or organic solvents. These large amounts of water or organic solvents are undesirable when the curable compositions are employed in printing machines, because the water or organic solvents must be removed in the printing machine, which is generally difficult and reducing printing speed.

There is a need for curable compositions providing soft touch coatings which can easily be processed in printing machines and avoid the aforementioned drawbacks. These curable compositions should provide soft touch coatings while particularly having a long shelf-life, short curing times, robust adhesion to the substrate, improved chemical resistance, excellent scratch resistance and non-yellowing properties.

It was now surprisingly found that curable compositions based on ethoxylated triacrylates and alkylglycidyletheracrylates provide soft touch coatings and at the same time can beneficially be processed in conventional printing machines without the addition of considerable amounts of water or organic solvents.

Accordingly, one aspect of the invention is a curable composition, containing:
a) at least one compound of the formula (I)

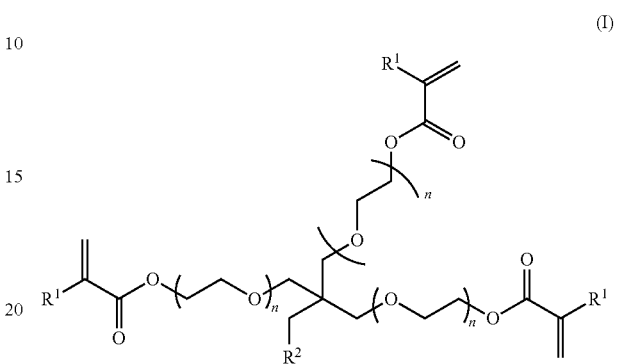

wherein
n is 1 to 20,
$R^1$ is H or methyl,
$R^2$ is H or $C_1$-$C_6$-alkyl,
b) at least one compound of the formula (II)

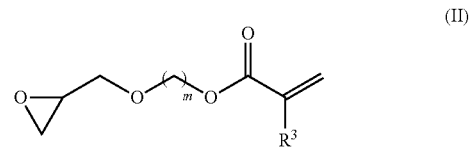

wherein
m is 1 to 30,
$R^3$ is H or methyl,
and
c) at least one polymerization initiator.

A further aspect of the invention is a method of coating a substrate, which contains the steps of:
i) applying the curable composition of the invention to a substrate; and
ii) curing the substrate obtained in step i).

Further aspects of the invention are the use of the curable composition of the invention in coatings, cured compositions resulting from curing the curable compositions and articles containing the cured composition of the invention.

The curable composition of the invention comprises as component a) at least one compound of the formula (I), wherein n is 1 to 20, $R^1$ is H or methyl and $R^2$ is H or $C_1$-$C_6$-alkyl. In a preferred embodiment, n is 2 to 15, more preferably 3 to 8, and $R^2$ is H or $C_1$-$C_3$-alkyl, more preferably methyl.

In a specific embodiment, the at least one compound of the formula (I) is an ethoxylated trimethylolpropanetriacrylate.

The curable composition of the invention comprises as component b) at least one compound of the formula (II), wherein m is 1 to 30 and $R^3$ is H or methyl. In a preferred embodiment, m is 3 to 20, more preferably 12 to 16.

In a specific embodiment, the at least one compound of the formula (II) is $C_{12}$-$C_{16}$-alkylglycidylethermonoacrylate.

In a particularly preferred embodiment, in the formula (I) n is 5 and in the formula (II) m is 12 to 16.

Particularly preferred are curable compositions of the invention, wherein in the formula (I) n is 5, $R^1$ is H or methyl, $R^2$ is methyl, and in the formula (II) m is 12 to 16 and $R^3$ is H or methyl.

$C_1$-$C_6$-alkyl is a linear or branched, saturated hydrocarbon chain with 1 to 6 carbon atoms, for example methyl, ethyl, n-propyl, iso-propyl, n-butyl, iso-butyl, sec-butyl, tert-butyl, n-pentyl or n-hexyl.

The curable composition of the invention contains as component c) at least one polymerization initiator.

The polymerization initiator is preferably selected from photoinitiators and thermal free-radical initiators. Photoinitiators are compounds which form free radicals upon exposure to radiation, in particular UV radiation. Thermal free-radical initiators form free radicals upon warming, for example upon electric heating. The at least one polymerization initiator may comprise more than one compound and can may also comprise auxiliary substances like amine synergists, for example tertiary amines like triethanolamine, N-methyldiethanolamine or acrylated amines.

SUMMARY OF THE INVENTION

Accordingly, the curing of the curable composition is preferably effected by exposure to radiation, in particular visible radiation, UV radiation, electron-beam radiation or microwave radiation or combinations thereof.

Preferred polymerization initiators are photoinitiators. Preferred photoinitiators are selected from α-hydroxyketones, phenylglyoxylates, benzyldimethylketals, α-aminoketones, mono-acylphosphines, bis-acylphosphines, phosphine oxides, metallocenes and mixtures thereof. Preferred are also polymeric analogues of these photoinitiators. In particularly preferred embodiments, the polymerization initiator is at least one photoinitiator selected from 1-hydroxycyclohexylphenylketone, 2-hydroxy-2-methyl-1-phenyl-1-propanone, 4-phenylbenzophenone and mixtures thereof. Most preferred polymerization initiators are selected from 4-phenylbenzophenone, 1-hydroxycyclohexyl-phenylketone and mixtures thereof. In a specific preferred embodiment, the polymerization initiator comprises 4-phenylbenzophenone, 1-hydroxycyclohexylphenylketone and N-methyldiethanolamine.

The curable compositions of the invention have viscosities which allow for easy processing in printing machines. Generally, it is not necessary to add considerable amounts of solvents like water or organic solvents in order to allow for easy processing in printing machines.

The curable composition of the invention preferably does not contain a large amount of water. In preferred embodiments, the water content of the curable composition of the invention is less than 30 weight-%, more preferably less than 20 weight-% and most preferably less than 15 weight-%, based on the weight of the curable composition.

In preferred embodiments, the amount of other solvents than water, in particular the amount of organic solvents, is less than 20 weight-%, more preferably less than 10 weight-% and most preferably less than 5 weight-%, based on the weight of the curable composition.

Preferably, the amount of the at least one compound of the formula (I) in the curable composition is in the range from 20 to 90 weight-%, more preferably in the range from 30 to 80 weight-% and most preferably in the range from 40 to 70 weight-%, based on the weight of the curable composition.

Preferably, the amount of the at least one compound of the formula (II) in the curable composition is in the range from 5 to 50 weight-%, more preferably in the range from 10 to 35 weight-% and most preferably in the range from 15 to 25 weight-%, based on the weight of the curable composition.

Preferably, the amount of the polymerization initiator in the curable composition is in the range from 0.1 to 20 weight-%, more preferably in the range from 1 to 10 weight-%, based on the weight of the curable composition.

The curable compositions of the invention may comprise additives. Preferably, the amount of additives in the curable composition is in the range from 1 to 30 weight-%, more preferably in the range from 5 to 20 weight-%, based on the weight of the curable composition.

Preferred additives are polymer waxes, polymer beads, leveling agents, wetting agents, matting agents, colorants, dyes, pigments, slip agents, adhesion promoters, fillers, rheology modifiers, thixotropic agents, plasticizers, UV absorbers, UV stabilizing agents, dispersants, antioxidants, antistatic agents, lubricants, opacifying agents, anti-foaming agents and combinations thereof.

In preferred embodiments, the curable composition of the invention contains at least one polymer wax, in particular at least one Fischer Tropsch wax.

In further preferred embodiments, the curable composition of the invention contains polymer beads, for example based on polyacrylate, polyurethane, polyamide, polyethylene, polytetrafluoroethylene and combinations thereof. Particularly preferred are polyurethane beads.

In particularly preferred embodiments, the curable composition of the invention comprises the combination of at least one polymer wax, in particular at least one Fischer Tropsch wax, and polymer beads, in particular polyurethane beads.

Preferably, the curable compositions of the invention have a viscosity of less than 4,500 mPa·s or less than 3,500 mPa·s or less than 3,000 mPa·s or less than 2,500 mPa·s, measured with a cone-plate viscosimeter at room temperature. Preferably, the viscosity of the curable composition is in the range from 30 to 4,000 mPa·s, more preferably in the range from 40 to 2,000 mPa·s and most preferred in the range from 50 to 1,000 mPa·s, measured with a cone-plate viscosimeter at room temperature.

The invention also relates to a method of coating a substrate, which includes the steps of:
i) applying the curable composition of the invention to a substrate; and
ii) curing the substrate obtained in step i).

The curable composition in step i) may be applied in any known conventional manner, for example by spraying, knife coating, roller coating, casting, drum coating, dipping, screening and combinations thereof. In particularly preferred embodiments, the curable composition in step i) is applied to the substrate by conventional means in a printing machine, i.e. via transfer by cylinders and rollers, in particular by an anilox roller.

Preferably, the applying of the curable composition to the substrate in step i) is effected by printing, in particular in a printing machine. Suitable printing methods are principally known to a person skilled in the art and are selected from printing with an anilox and other rollercoaters, flexographic printing, offset printing, gravure printing, letterpress printing, screen printing and combinations thereof.

Preferably, the curable composition of the invention is provided in the form of a one-part system. This means that the curable composition can be stored and applied when required. In contrast thereto, in two-part systems two mixtures are employed which generally cannot be stored as a mixture and need to mixed immediately prior to application.

Step ii) of the method of the invention includes curing the substrate obtained in step i). The curing preferably includes curing by exposure to radiation, in particular visible radiation, UV radiation, electron-beam radiation or microwave radiation or combinations thereof. Particularly preferred is curing by exposure to UV radiation.

Suitable substrates to be coated by the method of the invention are selected from paper, paperboard, metals, in particular steel, glass, thermoplastics, composites, wood, leather and combinations thereof.

Curing of the curable composition, preferably via UV radiation, leads to a cured composition, which is likewise subject-matter of the present invention.

Further subject-matter of the present invention is an article comprising the cured composition of the invention, for example paper or paperboard comprising the cured composition of the invention.

The curable composition of the invention allows for the production of soft touch coatings without greater amounts of solvents. These soft touch coatings can beneficially be produced with conventional printing machines.

Other features which are considered as characteristic for the invention are set forth in the appended claims.

Although the invention is described herein as embodied in curable compositions for printing applications, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the following examples.

BRIEF DESCRIPTION OF THE EXAMPLES

Employed chemicals are:
ethoxylated trimethylolpropanetriacrylate (CAS no. 28961-43-5) (in formula (I): n is 5, $R^1$ is H, $R^2$ is methyl), average molecular weight of 956 g/mol, Photomer® 4158 from IGM Resins;
$C_{12}$-$C_{16}$-alkylglycidyletheracrylate (CAS no. 68071-40-9) (in formula (II): m is 12 to 16, $R^3$ is H), average molecular weight of 334 g/mol, Miramer PE120 from Miwon;
4-phenylbenzophenone, >99%;
1-hydroxycyclohexylphenylketone, >99%;
N-methyldiethanolamine;
Fischer Tropsch wax (CAS no. 8002-74-2), average particle size of 5 to 9 μm, Glissaspray 8 from Parchvale;
crosslinked polyurethane beads, average particle size of 6 to 9 μm, Daiplacoat RHU 5070D from Dainichiseika; and
water, tap water.

Example 1: Preparation of the Curable Composition 1

56.8 g ethoxylated trimethylolpropanetriacrylate, 20.0 g $C_{12}$-$C_{16}$-alkylglycidyletheracrylate, 2.0 g 4-phenylbenzophenone, 1.2 g 1-hydroxycyclohexyl-phenylketone and 5.0 g N-methyldiethanolamine were mixed in a mixing vessel made of stainless steel with an internal agitator at a temperature of 45° C. until all solids were fully dissolved. To this mixture were added 5.0 g Fischer Tropsch wax and 10 g crosslinked polyurethane beads. The resulting mixture was mixed until a homogeneous solution was obtained. The solution was filtered through a 200 μm filter before further use.

Example 2: Preparation of the Curable Composition 2

49.4 g ethoxylated trimethylolpropanetriacrylate, 17.4 g $C_{12}$-$C_{16}$-alkylglycidyletheracrylate, 2.0 g 4-phenylbenzophenone, 1.2 g 1-hydroxycyclohexyl-phenylketone and 5.0 g N-methyldiethanolamine were mixed in a mixing vessel made of stainless steel with an internal agitator at a temperature of 45° C. until all solids were fully dissolved. To this mixture were added 5.0 g Fischer Tropsch wax, 10 g crosslinked polyurethane beads and 10.0 g water. The resulting mixture was mixed until a homogeneous solution was obtained. The solution was filtered through a 200 μm filter before further use.

Example 3: Application of the Curable Composition 2 from Example 2

In the printing machine Speedmaster® from Heidelberger Druckmaschinen AG, Heidelberg, 5 g/m² of the curable composition 2 from example 2 were applied to 1200 sheets of glossy and matt paper with an anilox roller. The coating was dried in the printing machines with three UV lamps. The printing speed was about 10,000 sheets per hour. The drying/coating speed was good, the processing properties in the printing machine were good and no blocking and no foaming occurred. The resulting paper had very good haptic soft touch properties.

The invention claimed is:
1. A curable composition, comprising:
a) at least one compound of formula (I):

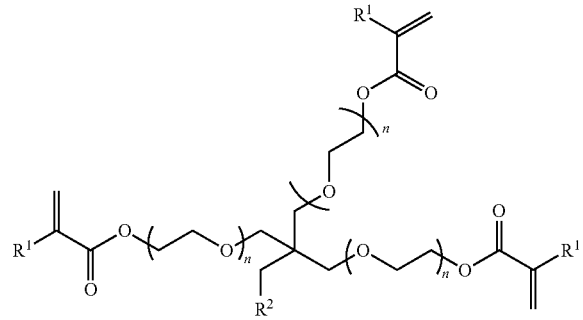

(I)

wherein:
n is 1 to 20;
$R^1$ is H or methyl;
$R^2$ is H or $C_1$-$C_6$-alkyl;
b) at least one compound of formula (II):

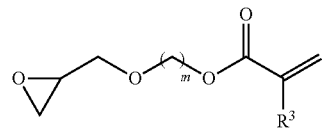

(II)

wherein:
   m is 1 to 30;
   $R^3$ is H or methyl;
   and
   c) at least one polymerization initiator.

2. The curable composition according to claim 1, wherein:
   n is 2 to 15;
   $R^2$ is H or $C_1$-$C_3$-alkyl; and
   m is 3 to 20.

3. The curable composition according to claim 1, wherein:
   n is 5; and
   m is 12 to 16.

4. The curable composition according to claim 1, wherein a water content of the curable composition is less than 30 weight-% based on the curable composition.

5. The curable composition according to claim 1, wherein:
   n is 3 to 8;
   $R^2$ is H or methyl; and
   m is 12 to 16.

6. The curable composition according to claim 1, wherein a water content of the curable composition is less than 20 weight-% based on the curable composition.

7. The curable composition according to claim 1, wherein a water content of the curable composition is less than 15 weight-% based on the curable composition.

8. A method for coating a substrate, which comprises the steps of:
   i) providing a curable composition, containing:
      a) at least one compound of formula (I):

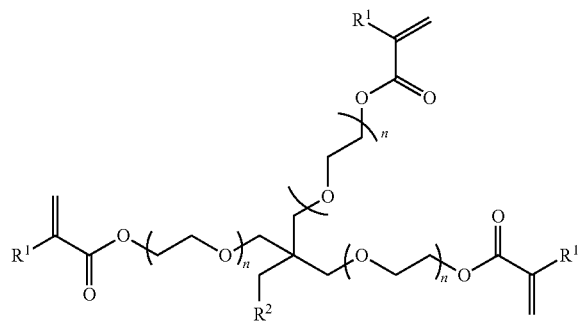

(I)

wherein:
   n is 1 to 20;
   $R^1$ is H or methyl;
   $R^2$ is H or $C_1$-$C_6$-alkyl;
   b) at least one compound of formula (II):

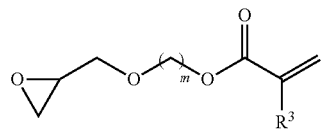

(II)

wherein:
   m is 1 to 30;
   $R^3$ is H or methyl; and
   c) at least one polymerization initiator.
   ii) applying the curable composition to the substrate; and
   iii) curing the substrate obtained in step ii).

9. The method according to claim 8, wherein the curable composition is applied in a form of a one-part system.

10. The method according to claim 8, wherein the curing of the substrate in step iii) comprises curing by exposure to radiation.

11. The method according to claim 8, wherein the applying step to the substrate in step ii) is effected by printing.

12. The method according to claim 11, wherein the printing is performed by printing with an anilox roller or other roller coaters, flexographic printing, offset printing, gravure printing, letterpress printing, screen printing and combinations thereof.

13. The method according to claim 8, wherein the substrate is selected from the group consisting of paper, paperboard, metals, in particular steel, glass, thermoplastics, composites, wood, leather and combinations thereof.

14. The method according to claim 10, wherein the curing of the substrate in step iii) comprises curing by exposure to visible radiation, UV radiation, electron-beam radiation or microwave radiation.

15. A coating, comprising:
   a curable composition, containing:
      a) at least one compound of formula (I):

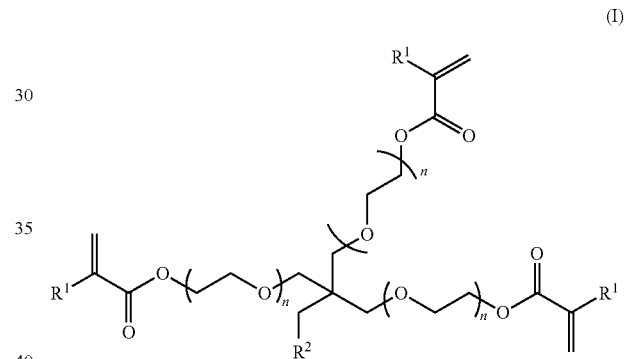

(I)

wherein:
   n is 1 to 20;
   $R^1$ is H or methyl;
   $R^2$ is H or $C_1$-$C_6$-alkyl;
   b) at least one compound of formula (II):

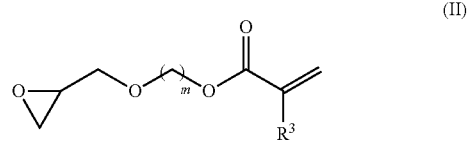

(II)

wherein:
   m is 1 to 30;
   $R^3$ is H or methyl; and
   c) at least one polymerization initiator.

16. The coating according to claim 15, where the coating is a soft touch coating.

17. A method for producing a cured composition, comprising:
   providing a curable composition, containing:
      a) at least one compound of formula (I):

(I)

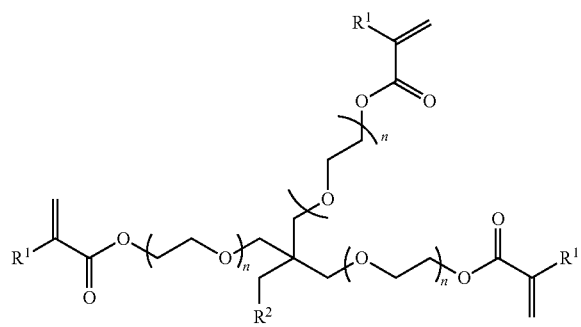

wherein:
n is 1 to 20;
$R^1$ is H or methyl;
$R^2$ is H or $C_1$-$C_6$-alkyl;
b) at least one compound of formula (II):

(II)

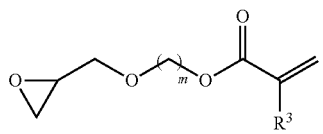

wherein:
m is 1 to 30;
$R^3$ is H or methyl; and
c) at least one polymerization initiator;
curing the curable composition resulting in the cured composition.

18. The method according to claim 17, wherein the cured composition is a coating.

19. The method according to claim 17, wherein the cured composition is a soft touch coating.

20. An article, comprising:
a curable composition, containing:
a) at least one compound of formula (I):

(I)

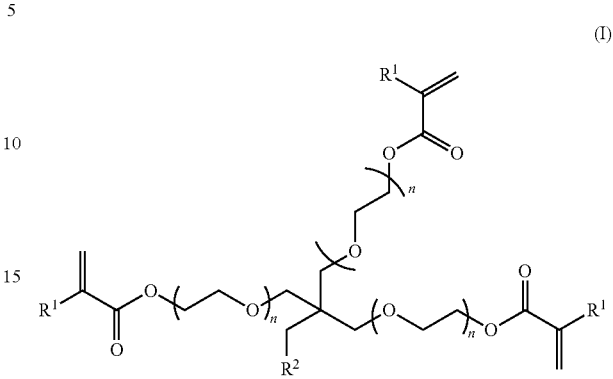

wherein:
n is 1 to 20;
$R^1$ is H or methyl;
$R^2$ is H or $C_1$-$C_6$-alkyl;
b) at least one compound of formula (II):

(II)

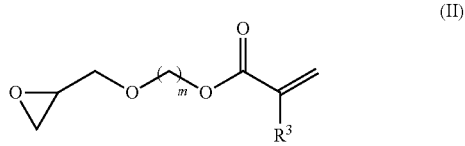

wherein:
m is 1 to 30;
$R^3$ is H or methyl; and
c) at least one polymerization initiator; and
said curable composition is cured.

* * * * *